United States Patent [19]
Yamashita et al.

[11] Patent Number: 5,131,297
[45] Date of Patent: Jul. 21, 1992

[54] SHIFT CONTROL METHOD OF CONTINUOUSLY VARIABLE TRANSMISSION

[75] Inventors: Yoshinori Yamashita, Shizuoka; Hiroaki Yamamoto, Hyogo, both of Japan

[73] Assignees: Suzuki Motor Corporation, Shizuoka; Mitsubishi Denki Kabushiki Kaisha, Tokyo, both of Japan

[21] Appl. No.: 662,287

[22] Filed: Feb. 28, 1991

[30] Foreign Application Priority Data

Feb. 28, 1990 [JP] Japan .................................. 2-48200
Feb. 28, 1990 [JP] Japan .................................. 2-48201

[51] Int. Cl.$^5$ ............................................. F16H 11/06
[52] U.S. Cl. .................................... 74/866; 364/424.1
[58] Field of Search ................... 74/866; 364/424.1; 474/18, 28

[56] References Cited

U.S. PATENT DOCUMENTS

| | | | |
|---|---|---|---|
| 4,663,990 | 5/1987 | Itoh et al. | 364/424.1 |
| 4,743,223 | 5/1988 | Tekero et al. | 474/28 X |
| 4,767,382 | 8/1988 | Tezuka et al. | 474/28 |
| 4,811,225 | 3/1989 | Petzold et al. | 364/424.1 |
| 4,867,732 | 9/1989 | Soga et al. | 474/28 |
| 4,913,005 | 4/1990 | Ishikawa et al. | 74/866 |

FOREIGN PATENT DOCUMENTS 64-44346 2/1989 Japan .

Primary Examiner—Leslie A. Braun
Assistant Examiner—Ryan W. Massey
Attorney, Agent, or Firm—Flynn, Thiel, Boutell & Tanis

[57] ABSTRACT

A shift control method is provided for controlling shifting in a continuously variable transmission. The transmission changes a gear ratio by increasing or decreasing the turning radius of a belt installed on a pair of pulleys. Each pulley includes a fixed pulley member and a movable pulley member, and the belt turning radius is varied by varying the width of a groove defined between the respective pulley members. The transmission has a shift control range associated therewith which is determined on the basis of the component structural elements thereof, and this shift control range is bounded by a ratio line. The shift control method includes providing a control means for setting a target engine speed according to input throttle opening and vehicle speed information, and setting a limit value of said target engine speed in the vicinity of the ratio line but outside of the shift control range.

4 Claims, 8 Drawing Sheets

MAP. NO.1

MAP NO.2

MAP NO.3

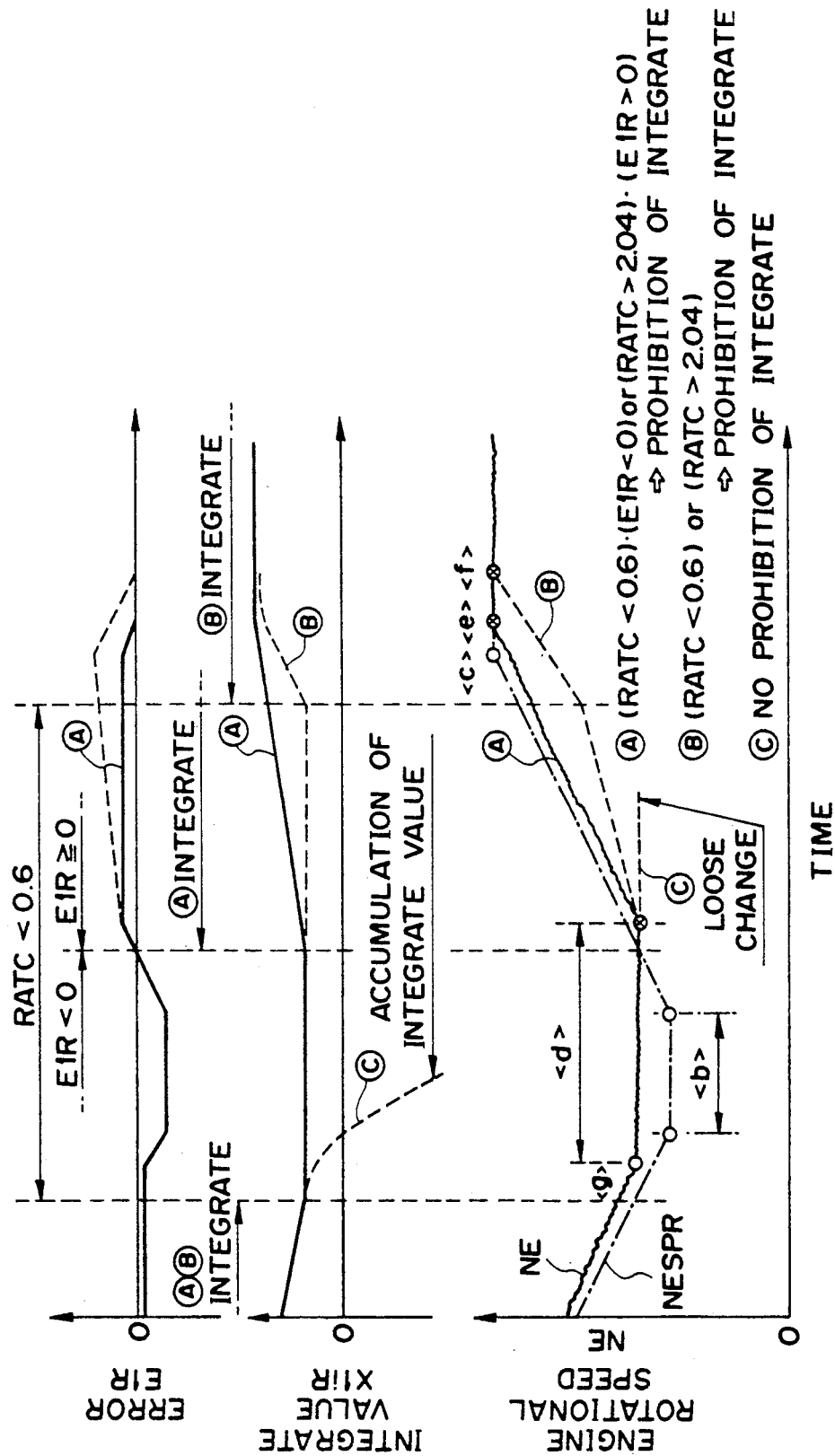

SHIFT CONTROL METHOD OF CONTINUOUSLY VARIABLE TRANSMISSION

FIELD OF THE INVENTION

The present invention relates to a shift control method of a continuously variable transmission and more particularly to a shift control method of a continuously variable transmission that is capable of avoiding the occurrence of excessive shift delay, albeit with the occurrence of a dimensional variation of transmission parts and an engine-speed signal error, by setting a limit value of a target engine speed in the vicinity of a ratio line of a shift control range determined by mechanical dimensions, but outside of the shift control range.

BACKGROUND OF THE INVENTION

In motor vehicles, there is a transmission interposed between an internal-combustion engine and vehicle wheels. This transmission changes wheel driving power and running speed to suit vehicle operating requirements which have a wide range of variation, thereby utilizing the performance of the internal-combustion engine to the fullest.

At present a continuously variable transmission is used to perform shift control for the purpose of changing a gear ratio by increasing or decreasing the turning radius of a belt mounted on a pulley by hydraulically increasing or decreasing the width of a groove formed between a fixed pulley member fixedly mounted on a rotating shaft and a movable pulley member which is movably mounted on the rotating shaft and which can move into contact with, and away from, this fixed pulley member.

This type of continuously variable transmission has been disclosed in Laid-Open Japanese Patent Application No. 64-44346. This transmission is designed to determine the optimum target speed from a first and a second target speed based on each of throttle opening and vehicle-speed detection signals, and to perform shift control in accordance with this optimum target speed, thus facilitating obtaining operating characteristics which suit the desires of the driver.

In the prior art shift control method, the overdrive line and full-low line are the boundary ratio lines which define therebetween the shift control range, and these lines are determined on the basis of the mechanical dimensions of the belt pulley members and other constitutive elements of the continuously variable transmission. However, since the engine speed is controlled for example to the overdrive line, the prior art shift control method has the disadvantage that when the lower limit value of the target engine speed is set at the same value as the theoretical overdrive line, if there occurs a mechanical difference or a dimensional variation of such parts as belt pulley members (sheaves), then the true overdrive line may be shifted from the theoretical line and the value of engine speed will be controlled not to the true overdrive ratio line of the continuously variable transmission but to an intermediate ratio line. That is, if the true overdrive ratio has become lower than the theoretical ratio, then the true shift control range will not be fully available.

Also the prior art shift control method has the disadvantage that even when a value of vehicle speed of an actual ratio due to the detection accuracy of a vehicle speed sensor is input into a control means, it is impossible to control to a desired overdrive ratio.

Meanwhile, another disadvantage is that when the lower-limit value of the target engine speed has been set to a much smaller ratio value than the overdrive ratio value, it takes much time to control the engine speed, hence causing the occurrence of a shift delay when controlling the engine speed from the overdrive ratio to an intermediate ratio or a full-low ratio.

Furthermore, another disadvantage is that there similarly occurs a shift delay when the engine speed is controlled from the full-low ratio to the intermediate ratio or the overdrive ratio.

The present invention has been accomplished in an attempt to obviate the aforementioned disadvantages and has an object the provision of a shift control method of a continuously variable transmission in which the limit value of the target engine speed is set to the vicinity of a ratio line determined according to machine dimensions, thereby enabling the prevention of excessive shift delay by properly controlling the engine speed in the event of dimensional variation of parts or an engine-speed signal error.

To accomplish the aforesaid object, the present invention provides a shift control method of a continuously variable transmission, which controls the shifting in order to change the gear ratio by increasing or decreasing the turning radius of a belt mounted on a pair of adjustable pulleys comprising a fixed pulley member and a movable pulley member which is movable into contact with, and away from, the fixed pulley member. The belt ratio is changed by increasing or decreasing the width of a groove provided between these two pulley members. In this shift control method, there is provided a control means for setting the target engine speed using input throttle opening and vehicle speed signals, whereby the limit value of the target engine speed is set to the vicinity of the ratio line of the shift control range as determined by constitutive elements of the transmission, but outside of the shift control range.

According to the method of the present invention, the control means receives the throttle opening and vehicle speed signals, sets the target engine speed, and sets the limit value of the target engine speed to the vicinity of the ratio line of the shift control range but outside of the shift control range, thereby avoiding excessive shift delay by properly controlling the engine speed in the event of a dimensional variation of components or an engine-speed signal error.

In the prior art shift control method, an actual engine speed error from a target engine speed is processed by proportional and integral processings to perform shift control in order to change the gear ratio. The ratio line which is a gear ratio limit value of this shift control is determined as an OVERDRIVE line or a FULL-LOW line according to machine dimensions of constitutive elements of the continuously variable transmission, the shift control being carried out in an intermediate ratio range between the OVERDRIVE line and the FULL-LOW line.

However, the actual ratio can move to the vicinity of the OVERDRIVE line or the FULL-LOW line, and when the actual engine speed is positioned on this ratio line, the target engine speed sometimes goes out of the intermediate ratio range set by the OVERDRIVE line and the FULL-LOW line, thus being positioned outside of the shift control range.

In this case, as there always takes place an error between the target engine speed and the actual engine speed, the accumulation of integral values continues, consequently resulting in an abnormal integral value and deteriorated shift control quality. For example, the actual engine speed fails to follow up a change in the target engine speed, and accordingly lowered follow-up performance results.

To obviate such a disadvantage when the ratio value has moved to the vicinity of the ratio line, a conceivable method of preventing the integral value from growing into an abnormal value is the prevention of accumulation of integral values by forbidding integral processing. However, if the integral processing is forbidden based solely and otherwise unconditionally on the ratio value, the integral processing required remains unexecuted and only the proportional processing is executed when the engine speed is changed to the intermediate ratio range side, resulting in a shift delay.

The present invention has been accomplished in an attempt to solve the problem mentioned above, and has an object to provide a shift control method of a continuously variable transmission capable of avoiding the deterioration of the follow-up performance of the target engine speed resulting from the occurrence of an abnormal integral value, and realizing a shift control method of a continuously variable transmission capable of preventing the shift delay caused by the unconditional prohibition of integral processing.

To accomplish the aforementioned object, the present invention provides a shift control method of a continuously variable transmission, characterized in that there is provided a control means for controlling shifting by subjecting an error of an actual engine speed from a target engine speed to proportional and integral processings, so that when the actual gear ratio has been changed by the control means to the vicinity of the gear ratio limit value of an intermediate gear ratio range, shift control is effected to forbid the integral processing except when specified conditions exist. Also, when the actual gear ratio is shifted from the vicinity of the gear ratio limit value to the range of the intermediate gear ratio, the integral processing is executed in order to change the gear ratio.

BRIEF DESCRIPTION OF THE DRAWINGS

Hereinafter, exemplary embodiments of a shift control method of a continuously variable transmission according to the present invention will be particularly and concretely described with reference to the accompanying drawings, in which:

FIG. 13 is a diagram showing a relationship between errors and integral values, and between the engine speed and time in the FIG. 10 shift control.

DETAILED DESCRIPTION

Figure 7:
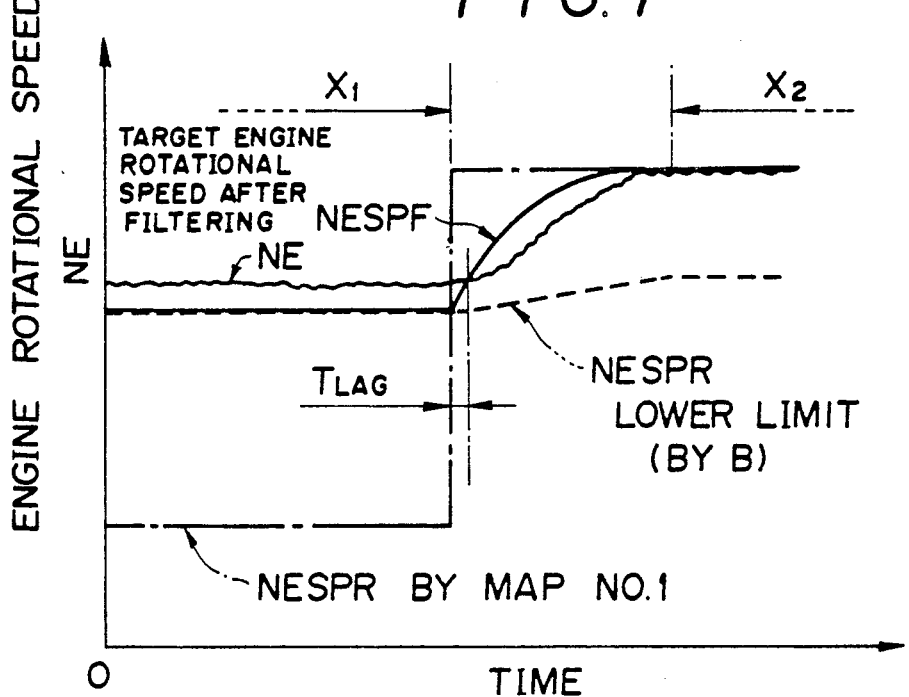
FIG. 7 is a diagram showing a relationship between engine speed and time on the lower limit value line B.
Figure 8:
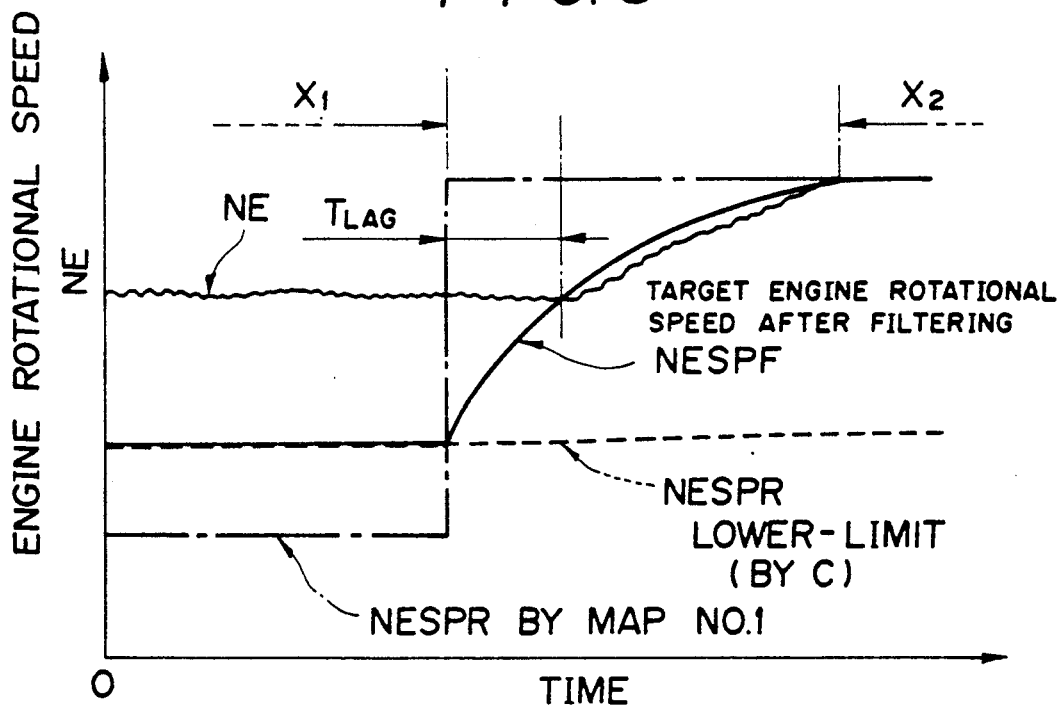
FIG. 8 is a diagram showing a relationship between engine speed and time on the lower limit value line C.
Figure 9:
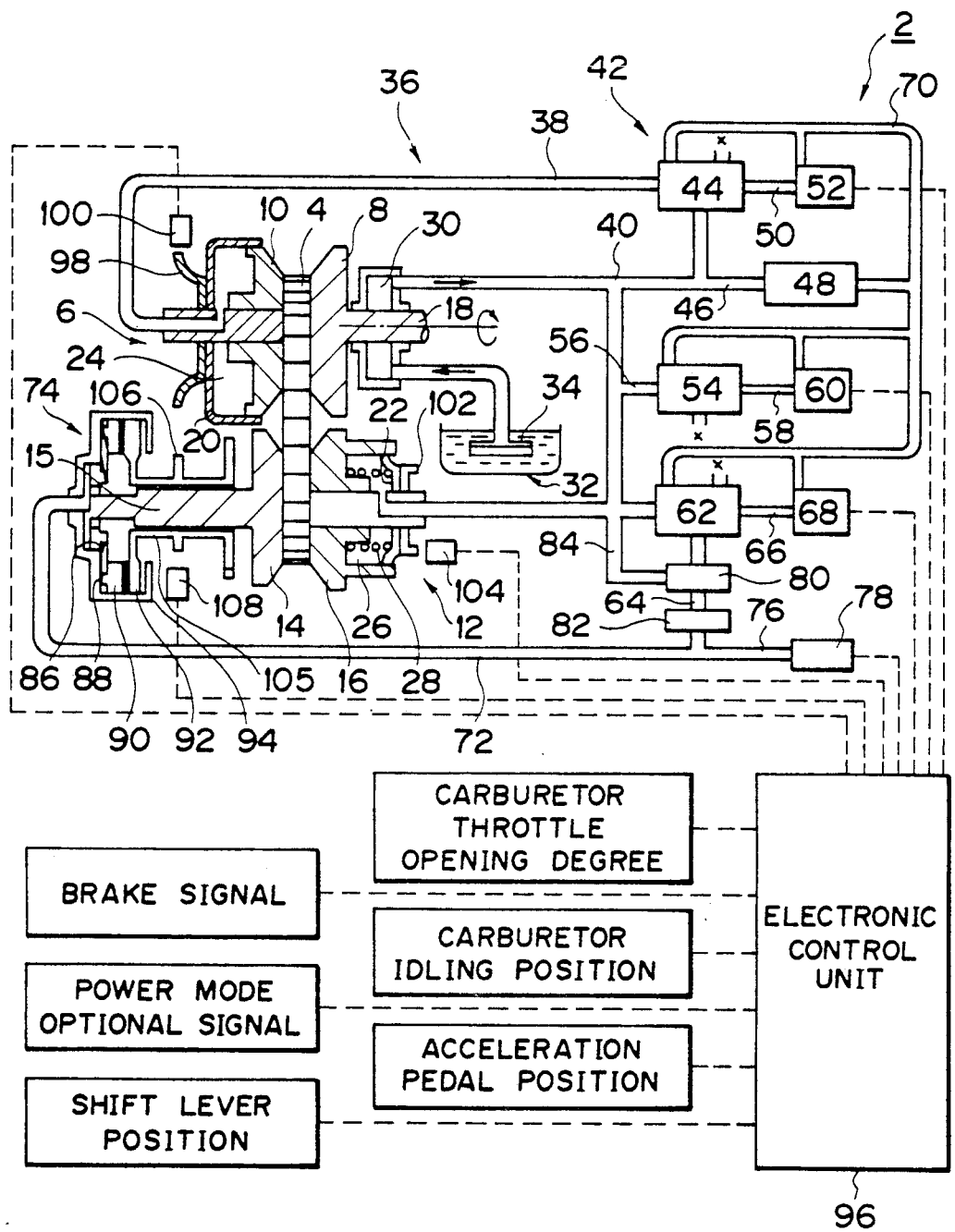
FIG. 9 is a hydraulic circuit diagram of the continuously variable transmission.

FIGS. 1 to 9 show an embodiment of the present invention. In FIG. 9, numeral 2 denotes a continuously variable transmission; numeral 4 is a belt, numeral 6 denotes a drive pulley; numeral 8 represents a fixed pulley member on the drive side; numeral 10 is a movable pulley member on the drive side; numeral 12 denotes a driven pulley; numeral 14 is a fixed pulley member on the driven side; and numeral 16 is a movable pulley member on the driven side.

The drive pulley 6, as shown in FIG. 9, has the fixed pulley member 8 which is secured on a rotating shaft 18 driven by the power from a prime mover, and the movable pulley member 10 which is mounted on the rotating shaft 18 and is movable in the axial direction of the rotating shaft 18 but does not rotate with the shaft.

The driven pulley 12 is of a similar constitution as the drive pulley 6 and has the fixed pulley member 14 fixed on shaft 15, and the movable pulley member 16 which is axially movable relative to pulley member 14.

The movable pulley member 10 and the movable pulley member 16 are mounted with respective first and second housings 20 and 22, forming first and second oil-pressure chambers 24 and 26. In the second oil-pressure chamber 26 is installed a spring 26 which presses the movable pulley member 16 toward the fixed pulley member 14.

On the rear end portion of the rotating shaft 18 is mounted an oil pump 30. This oil pump 30 supplies oil from an oil pan 32 into the first and second oil-pressure chambers 24 and 26 through an oil filter 34 and first and second oil passages 38 and 40 which constitute an oil-pressure circuit 36.

In the first oil passage 38 is installed a primary-pressure control valve 44 which is a shift control valve constituting a pressure control means 42 for controlling a primary pressure which is an input shaft sheave pressure.

In a third oil passage 46 which is connected to the second oil passage 40 on the oil pump 30 side of the primary-pressure control valve 44, there is provided a constant pressure control valve 48 for controlling the line pressure (generally 5-25 kg/cm$^2$) to a constant pressure (for example 3-4 kg/cm$^2$).

Furthermore, the primary-pressure control valve 44 is connected through a fourth oil passage 50 to a first three-way solenoid valve 52 for primary-pressure control.

The second oil passage 40 is connected through a fifth oil passage 56 to a line-pressure control valve 54 having a pressure-relief valve function for controlling the line pressure which is pump pressure The line-pressure control valve 54 is connected to a second three-way solenoid valve 60 through a sixth oil passage 58. Furthermore, in the second oil passage 40 between the second oil-pressure chamber 26 and the line-pressure control valve 54 is installed a clutch-pressure control valve 62 which controls the clutch pressure. This clutch-pressure control valve 62 is connected by an eighth oil passage 66 to a third three-way solenoid valve 68 for clutch-pressure control.

Furthermore, the primary-pressure control valve 44 is connected with the first solenoid valve 52, the constant-pressure control valve 48, the line-pressure control valve 54, the second three-way solenoid valve 60, the clutch-pressure control valve 62, and the third three-way solenoid valve 68 through a ninth oil passage 70.

The clutch-pressure control valve 62 communicates with a hydraulic clutch 74 through a tenth oil passage 72 connected with a seventh oil passage 64. This tenth oil passage 72 is connected to a pressure transducer 78 through an eleventh oil passage 76. In the seventh oil passage 64, a manual shift valve 80 and a shift servo valve 82 are installed in the aforementioned order from the clutch-pressure control valve 62. The manual shift valve 80 is connected to a twelfth oil passage 84 and to the seventh oil passage 64 on the upstream side of the clutch-pressure control valve 62.

In the HOLD and START modes the pressure transducer 78 can directly detect oil pressure at the time of clutch-pressure control, and gives an instruction for controlling the detected oil pressure to the target clutch pressure. In the DRIVE mode, as the clutch pressure becomes nearly equal to the line pressure, the pressure transducer 78 contributes to line-pressure control.

The hydraulic clutch 74 comprises a piston 86 disposed in an oil pressure chamber, an annular spring 88, a first pressure plate 90, a friction plate 92, and a second pressure plate 94.

Also there is provided a control means (ECU) to perform a shift control by changing a duty ratio according to various input conditions such as the amount of opening of a throttle valve in a carburetor (not illustrated). This control means 96 controls the opening and closing operation of the first three-way solenoid valve 52 for primary-pressure control, the second three-way solenoid valve 60 for line-pressure control, and the third three-way solenoid valve 68 for clutch-pressure control, and also controls the pressure transducer 78.

Next, various signals input into this control means 96 and their functions will be described in detail.

(1) Shift lever position detection signal

Control of line pressure, belt ratio, and clutch pressure demanded in each range by each of the range signals: P, R, N, D and L.

(2) Carburetor throttle valve opening detection signal

Detection of engine torque from prestored data in program, and decision of a target belt ratio or a target engine speed.

(3) Carburetor idle position detection signal

Improvement in accuracy of correction and control of carburetor throttle valve opening sensor.

(4) Accelerator pedal signal

Detection of a driver's intention according to a depressed state of the accelerator pedal, and precision of control method during running or at the time of starting.

(5) Brake signal

Detection of depression of the brake pedal, and decision of control method such as the release of the clutch.

(6) POWER mode option signal

Use of POWER mode as an option for purposes of utilizing vehicle performance for either sports or economy driving.

Outside of the first housing 20 is installed an input shaft rotation detection gear 98. In the vicinity of the outer peripheral part of this input shaft rotation detection gear 98 is mounted a first rotation detector 100. Further, outside of the second housing 22 is installed an output shaft rotation detection gear 102. In the vicinity of the outer peripheral portion of this output shaft rotation detection gear 102 is installed a second rotation detector 104. Detection signals from the first rotation detector 100 and the second rotation detector 104 are provided to the control means 96 and utilized to determine the engine speed and the belt ratio.

The hydraulic clutch 74 has an output transmission gear 106 formed on a sleeve-like output shaft 105. The output shaft 105 is connected to the friction plate 92. In the vicinity of the outer peripheral portion of this output transmission gear 106 is mounted a third rotation detector 108 for the detection of rotation of output shaft 105. The third rotation detector 108 also functions to detect the rotation of unillustrated drive train components driven by gear 106, such as a reduction gear and a differential, a drive shaft, and the final output shaft directly coupled to tires, enabling the detection of the vehicle speed.

The provision of the second rotation detector 104 and the third rotation detector 108 enables the detection of rotation of the input and output shafts of the hydraulic clutch 74, thereby detecting the amount of clutch slip.

The control means 96, which may be conveniently implemented using a conventional microprocessor circuit, functions to set the target engine speed from the amount of opening of the throttle valve and the vehicle speed, and to set the limit value of this target engine speed to the vicinity of the ratio line of the shift control range determined by the constitutive elements of the transmission, but outside of the shift control range. To describe this more particularly, the control means 96, as shown in FIGS. 2 to 5, calculates a specific target engine speed (NESPR) from the throttle opening input using a first map at 301, calculates the upper limit (NESPR UPPER-LIMIT) from the vehicle speed input using a second map at 302, which upper limit is the basic limit value of this specific target engine speed (NESPR), and also calculates a basic lower limit (NESPR LOWER-LIMIT) using a third map at 303, thereby determining the range of the target engine speed. The control means 96 sets the upper and lower limit values of the target engine speed to the vicinity of the FULL-LOW line P and the OVERDRIVE Line Q (see FIG. 6), respectively. These lines P and Q are theoretical ratio lines which define therebetween the shift control range and are determined by the constitutive elements of the continuously variable transmission 2, that is, by the machine dimensions of such parts as each pulley member and belt. However, the limit values are set outside of the shift control range as defined between the FULL-LOW line P and the OVERDRIVE line Q.

Figure 6:
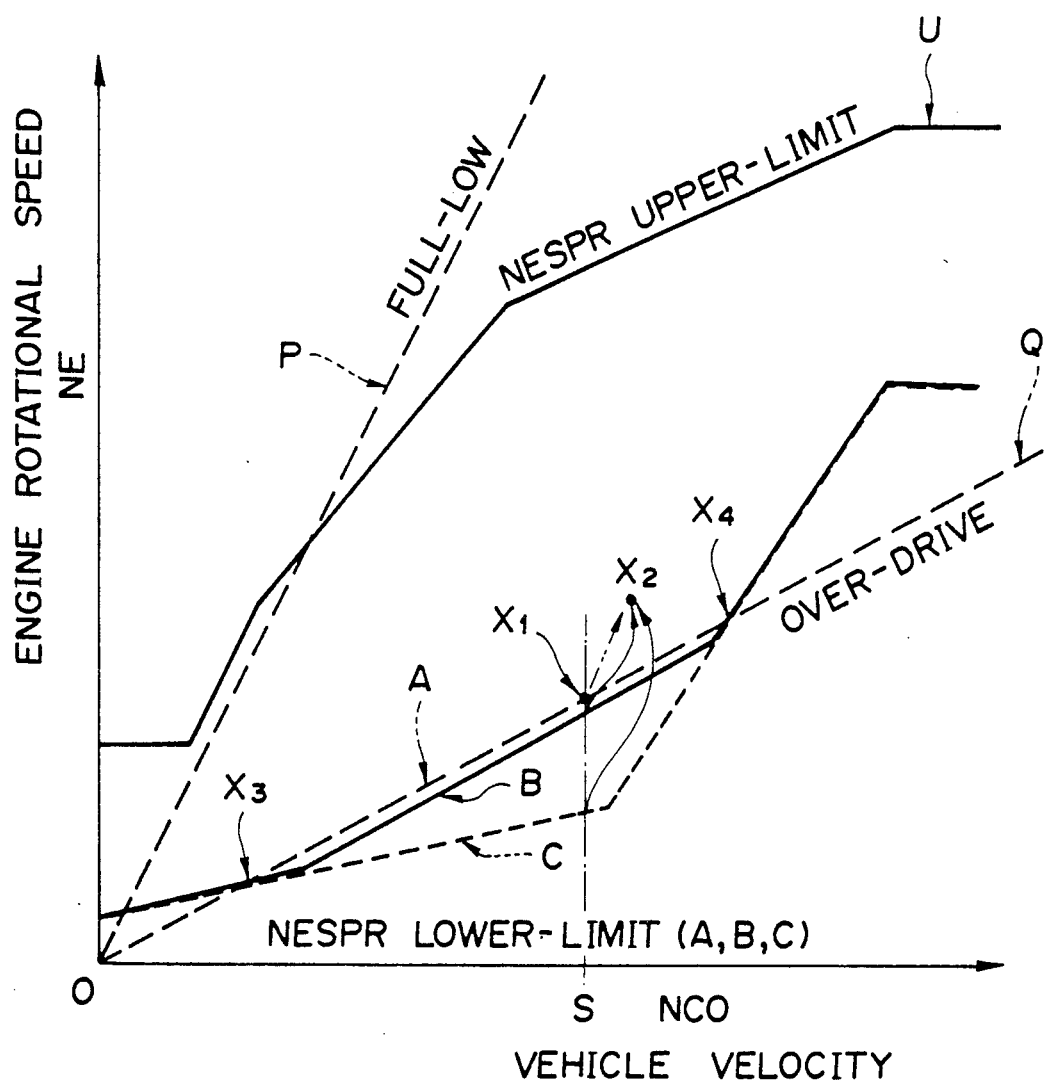
FIG. 6 is a shift curve diagram showing gear ratio values.

In this embodiment, the upper limit of the target engine speed (NESPR UPPER-LIMIT) is set to the vicinity of the theoretical FULL-LOW line P but outside of the shift control range, that is, to the upper limit value line U outside of the shift control range as shown by shift curves in FIG. 6. This upper limit value line U is a value 200 rpm higher than the theoretical FULL-LOW line P, or 1.1 times the theoretical FULL-LOW ratio as determined by machine dimensions.

The lower limit value of target engine speed (NESPR LOWER-LIMIT) is set to the vicinity of the theoretical OVERDRIVE line Q but outside of the shift control range, that is to the lower limit value line B outside of the shift control range, as shown by shift curves in FIG. 6. This lower limit line B is a value 200 rpm lower than the theoretical OVERDRIVE line Q, or 90% of the theoretical OVERDRIVE ratio as determined by machine dimensions.

Next, the function of the present embodiment will hereinafter be explained.

In this continuously variable transmission 2, as shown in FIG. 9, the oil pump 30 mounted on the rotating shaft 18 operates with the rotation of the rotating shaft 18, drawing up the oil from the oil pan 32 through the oil filter 34. The pump pressure, or the line pressure, is controlled by means of the line-pressure control valve 54. When a large amount of oil escapes from this line-pressure control valve 54, the line pressure will become lower. Reversely, when the amount of oil escaping is small, the line pressure will become higher.

The operation of the line-pressure control valve 54 is controlled by the second three-way solenoid valve 60 provided specially for this purpose. The operation of this second three-way solenoid valve 60 is followed by the operation of the line-pressure control valve 54. This second three-way solenoid valve 60 is controlled by a signal from ECU 96 having a duty ratio of constant frequency. That is, at the duty ratio of 0%, the second three-way solenoid valve 60 is not operating at all; in this state, the output side of valve 60 is communicating with the atmosphere and accordingly no output oil pressure is present. Also, at the duty ratio of 100%, the second three-way solenoid valve 60 is operating, with the output side thereof communicating with the input side thereof to produce the maximum output oil pressure which is equal to the control pressure in passage 70. Namely, the output oil pressure is changed in accordance with a change in the duty ratio of the control signal applied to the second three-way solenoid valve 60. Therefore, the second three-way solenoid valve 60 has such a characteristic that the line-pressure control valve 54 can be analogously operated depending on the output oil pressure of the valve 60. The line pressure can thus be controlled by changing the duty ratio of the second three-way solenoid valve 60 as the driver desires. The operation of this second three-way solenoid valve 60 is controlled by the control means 96.

The primary pressure for shift control is controlled by means of the primary-pressure control valve 44, the operation of which, similarly to the line-pressure control valve 54, is controlled by the first three-way solenoid valve 52 specially provided for this purpose. This first three-way solenoid valve 52 is used to connect the primary-pressure side (i.e., passage 38) to the line-pressure side (i.e., passage 40), or the primary-pressure side to the atmosphere, shifting the gear ratio to the FULL-OVERDRIVE side at the line pressure, or to the FULL-LOW side at the atmospheric pressure side.

The clutch-pressure control valve 62 for controlling the clutch pressure is used to connect the clutch-pressure side (i.e., passage 72) to the line-pressure side when the maximum clutch pressure is required, and also to the atmosphere side when the minimum clutch pressure is required. The operation of this clutch-pressure control valve 62 is controlled by the third three-way solenoid valve 68, similarly to the line-pressure control valve 54 and the primary-pressure control valve 44 described above. The clutch pressure varies within the range of from the minimum atmospheric pressure (zero) to the maximum line pressure. This clutch-pressure control is changed according to the pattern mentioned above.

The primary-pressure control valve 44, the line-pressure control valve 54, and the clutch-pressure control valve 62 are each controlled by an output oil pressure from the first, second and third three-way solenoid valves 52, 60 and 68 respectively. The control oil pressure used to control the first, second and third three-way solenoid valves 52, 60 and 68 is a constant oil pressure provided by the constant-pressure control valve 48. This control oil pressure is a stabilized, constant pressure, being kept lower than the line pressure at all times. Furthermore, the control oil pressure is led into each of the control valves 44, 54 and 62 for the purpose of maintaining the stabilized operation of these valves.

In this continuously variable transmission 2, oil pressure is controlled, and the control means 96 gives instructions to gain a proper line pressure for keeping the belt in proper position and torque transmission, a primary pressure for changing the gear ratio, and to maintain a clutch pressure for proper connection of the hydraulic clutch 74. By varying the primary pressure in passage 38, the belt turning radius is varied to thereby change the belt ratio. Next, shift control including setting the upper and lower limits of the target engine speed in the control means 96 will be explained with reference to the flowchart in FIG. 1.

The control means 96 judges (Step 202) whether or not the vehicle is in a running state when the program starts (Step 201).

Figure 1:
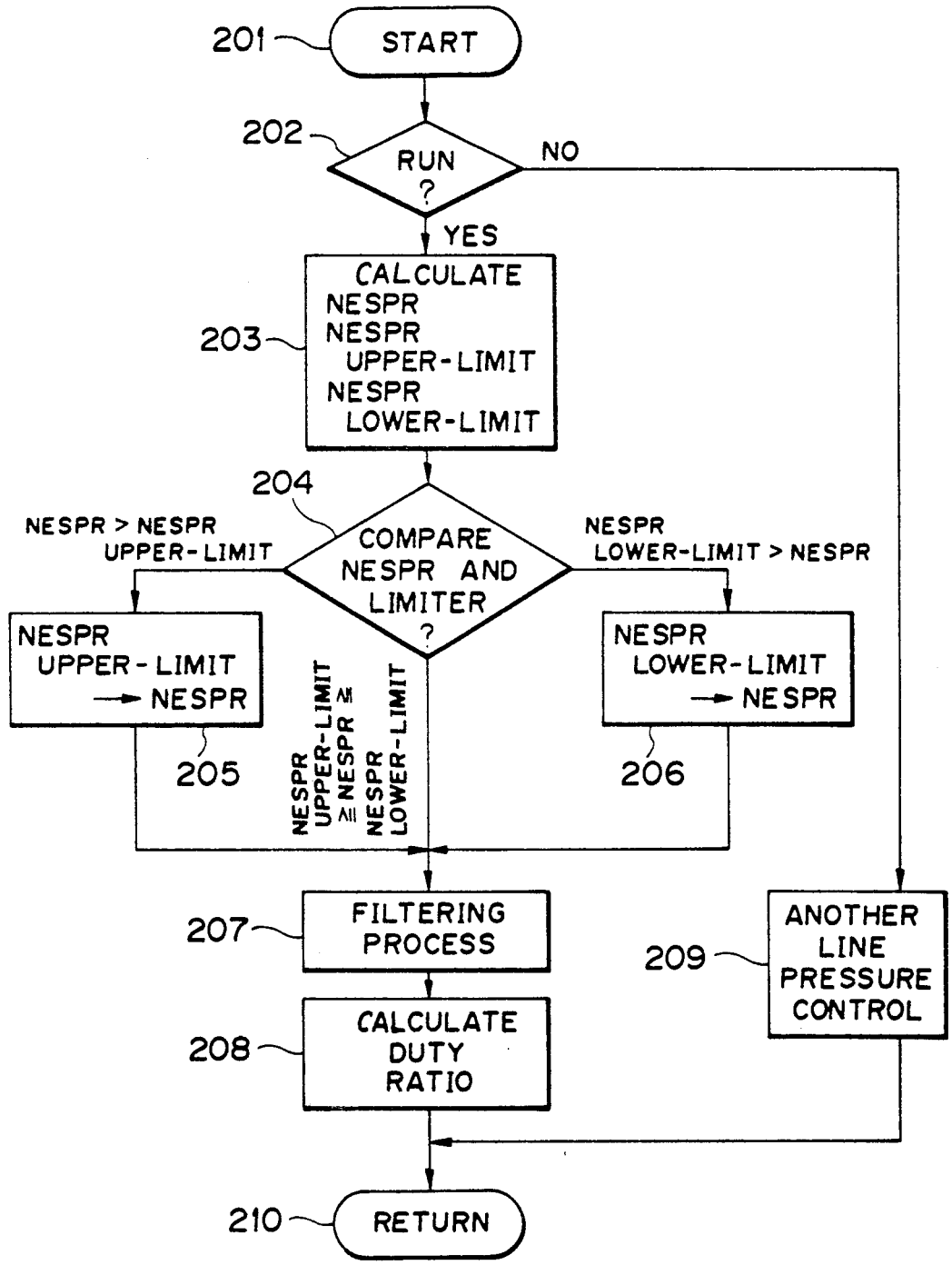
FIG. 1 is a flowchart explaining the function of a shift control method according to the invention.
Figure 2:
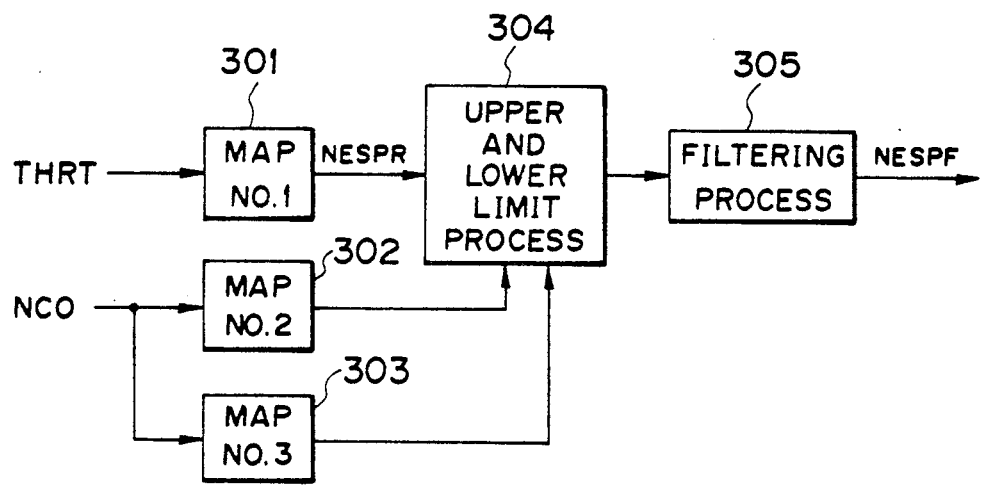
FIG. 2 is a control block diagram of the FIG. 1 shift control.
Figure 3:
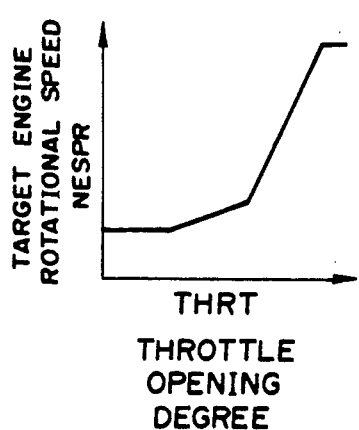
FIG. 3 is a first map diagram for determining a target engine rotational speed.
Figure 4:
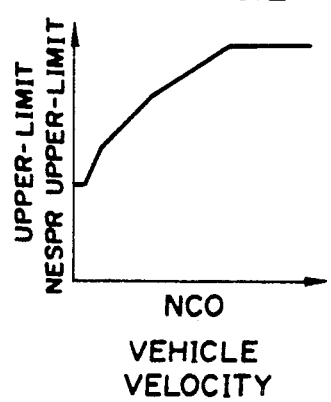
FIG. 4 is a second map diagram for determining an upper limit for the target speed.
Figure 5:
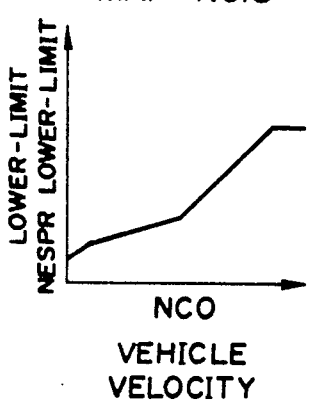
FIG. 5 is a third map diagram for determining a lower limit for the target speed.

If YES at this Step 202, Step 203 is executed, wherein the throttle opening degree (THRT) will be input to a first map 301, as shown in FIG. 2. In this first map 301, as shown in FIG. 3, the target engine speed (NESPR) is computed in accordance with the throttle opening (THRT). Also in Step 203, the vehicle speed (NCO), or the number of revolutions on the clutch output side from the third rotation detector 108 is input into a second map 302 and a third map 303. In this second map 302, the basic upper limit (NESPR UPPER-LIMIT) of the target engine speed is set in accordance with the vehicle speed (NCO) as shown in FIG. 4. Also in the third map 303 the basic lower limit (NESPR LOWER-LIMIT) of the target engine speed is set in accordance with the vehicle speed (NCO) as shown in FIG. 5.

Subsequently, the target engine speed (NESPR) computed in the first map 301 is processed (304) relative to its upper and lower limits according to the upper limit value (NESPR UPPER-LIMIT) of the target engine speed set in the second map 302 and the lower limit value (NESPR LOWER-LIMIT) of the target engine speed set in the third map 303.

In the present embodiment, the upper limit value (NESPR UPPER-LIMIT) of the target engine speed is set to the vicinity of the FULL-LOW line P as shown by the upper limit value line U outside of the shift control range in FIG. 6. This upper limit value line U is a value 200 rpm higher than the FULL-LOW line P, or 1.1 times the FULL-LOW ratio as determined by the machine dimensions.

Further in the present embodiment, the lower limit value (NESPR LOWER-LIMIT) of the target engine speed, as shown by the shift curves in FIG. 6, is set to the vicinity of the OVERDRIVE line Q as shown by line B outside of the shift control range. This lower limit value line B is a value 200 rpm lower than the OVERDRIVE line Q or 90% of the OVERDRIVE ratio as determined by the machine dimensions.

In the upper-lower limit processing 304, a comparison is made (Step 204) between the target engine speed (NESPR) and the upper limit value (NESPR UPPER-LIMIT) and the lower limit value (NESPR LOWER-LIMIT) of the target engine speed.

In this upper-lower limit processing 304, when NESPR > NESPR UPPER-LIMIT, NESPR is set to NESPR UPPER-LIMIT (Step 205) and then filtered through a filter processing 305 (Step 207). Similarly, when NESPR LOWER-LIMIT > NESPR, NESPR is set to NESPR LOWER-LIMIT (Step 206) and then filtered through the filter processing 305 (Step 207). Furthermore, when NESPR UPPER-LIMIT ≧ NESPR ≧ NESPR LOWER-LIMIT, the limit values will simply be processed by the filter processing 305 (Step 207).

Then, the control signal duty ratio for solenoid valve 52 is computed (Step 208) on the basis of the filtered target engine speed NESPF output from the filter processing 305.

In the meantime, at Step 202, when the answer is "NO" with the vehicle remaining stationary, other ratio control normally set will be conducted (Step 209), then returning to Step 210.

In this embodiment, it is for the reason described below that the upper limit value line U and the lower limit value line B of the target engine speed are set as described above.

The setting of the lower limit value line B is executed for the following reason. In the shift curves in FIG. 6, the engine speed is to be controlled between $X_3$ and $X_4$ on the OVERDRIVE line Q. In the shift curves diagram of FIG. 6, the lower limit value line (NESPR LOWER-LIMIT) is set to each of the A, B and C lines for comparison. The lower limit value line A is set similarly to the OVERDRIVE line Q determined by machine dimensions. The lower limit line B, which is provided by the disclosed embodiment, is set in the vicinity of the OVERDRIVE line Q but outside of the shift control range. The lower limit value line C is set much lower than the OVERDRIVE line Q.

With the target engine speed set to the lower limit value line A, it is possible to control the engine speed on the OVERDRIVE line Q when the true OVERDRIVE line Q agrees with the lower limit value line A or when the true OVERDRIVE line Q has shifted to a higher value than the lower limit value line A. In this case, however, since the engine speed is controlled to the intermediate ratio in order to lower the engine speed to the lower limit value line A, when true the OVERDRIVE line Q is lower than the lower limit value line A, it is impossible to control the engine speed on the true OVERDRIVE line Q.

In the meantime, in the case of the lower limit value lines B and C, it is possible to control the engine speed on the OVERDRIVE line Q even when the OVERDRIVE line Q has varied to a lower ratio.

On the lower limit value line C, however, when compared with the lower limit value line B, there takes place a longer shift delay. To describe this in detail, in the shift curves diagram of FIG. 6, as the amount of throttle opening varies from $X_1$ to $X_2$ (expressed at the vehicle speed S), the engine speed on the lower limit value lines B and C is higher than the target engine speed NESPR set at the first map according to the throttle opening in the $X_1$ state, as shown in FIGS. 7 and 8. Therefore, the target engine speed NESPR is set to a value on the lower limit value lines B and C.

In the meantime, since the lower limit value lines B and C are lower than the OVERDRIVE line Q, an actual engine speed is held on the OVERDRIVE line Q. The target engine speed NESPR set by the first map at 301 increases beyond the lower limit value lines B and C with a change in the amount of throttle opening, the engine speed. This means that the target engine speed has changed from a value on the lower limit value lines B and C to the target engine speed set by the first map 301. The engine speed will then be controlled so as to become the filtered target engine speed (NESPF). Due to the smoothing effect of the filter block 305, a time lag occurs before the filtered target engine speed (NESPF) becomes the same as the target engine speed NESPR set by the first map when the throttle opening reaches position $X_2$.

The engine speed control for holding the actual engine speed (NE in FIGS. 7 and 8) on the OVERDRIVE line Q is conducted until the filtered target engine speed (NESPF) rises above the actual engine speed. The target engine speed NESPR associated with throttle position $X_1$ is lower at the lower limit value line C than at the lower limit value line B, and therefore the filter-induced time lag associated with the lower limit value line C (see FIG. 8) is longer than the time lag associated with lower limit value line B (see FIG. 7).

Therefore, in setting the lower limit value of the target engine speed, the lower limit value line B in the shift curves in FIG. 6 is selected from among the lower limit value lines A, B and C.

The upper limit value line U is set for the same reason as the lower limit value line B described above, and therefore will not be described here.

In consequence, because the upper and lower limit values of the target engine speed are set in the vicinity of the theoretical ratio line but outside of a selectable ratio range of the shift control range, it is possible to properly control the engine speed to prevent a shift delay effectively even if there occurs any mechanical difference, dimensional error of such parts as belt and pulley members, or an engine-speed signal error.

As is obvious from the description given above, the present invention is capable of preventing an excessive shift delay by properly controlling the engine speed by means of a control means for setting a target engine speed on the basis of input throttle opening and vehicle speed signals. Because of possible dimensional error in construction of the transmission, upper and lower limit values of the target engine speed are set in the vicinity of the theoretical ratio line but outside of the shift control range.

FIGS. 10-13 illustrate another shift control method of the continuously variable transmission 2, wherein the control unit 96 performs shift control to change the gear ratio by proportionally and integrally processing an error of an actual engine speed relative to the target engine speed which is calculated from throttle opening and vehicle speed. That is, the control unit 96 performs shift control to change the gear ratio by forbidding the integral processing described above when the actual gear ratio has changed to the vicinity of the gear ratio limit value of the intermediate gear ratio range, and also performs the integral processing when changing the actual gear ratio from the vicinity of the gear ratio limit value to the intermediate gear ratio range side.

Figure 11:
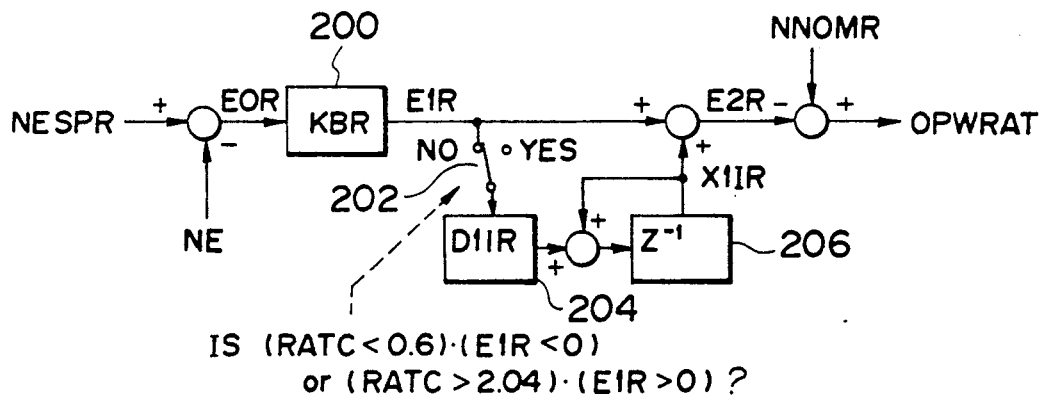
FIG. 11 is a block diagram of the FIG. 10 shift control.

To describe this in detail, an error EOR is computed by comparing the target engine speed NESPR (determined on the basis of throttle opening and vehicle speed) with the actual engine speed NE as shown in FIG. 11. This error EOR is processed by proportional processing, thus obtaining a first error E1R from a proportional gain KBR (200). The first error E1R is switched by changeover unit 202 to an integral gain unit 204 having a transfer characteristic of D1IR and an integral unit 206 having a transfer characteristic of $Z^{-1}$ (i.e., one sample delay). The integral processing of units 204 and 206 is performed to produce an integral value X1IR. Based on X1IR and the output of integral gain unit 204, the integral unit 206 produces an updated integral value X1IR.

Subsequently, a second error E2R is computed from the first error E1R and the integral value X1IR, and the second error E2R is subtracted from a ratio solenoid null value NNOMR, thus performing shift control of the continuously variable transmission 2 using the resulting ratio solenoid duty OPWRAT.

The integral processing described above is expressed by $$X1IR = (\text{previous } X1IR) + \{E1R * D1IR\}$$

$$E1R = (NESPR - NE) * KBR.$$

This integral processing is prohibited by removing E1R * D1IR from the formula for X1IR by the changeover of the changeover unit 202 to the YES side when an actual ratio RATC and the first error E1R satisfies either of {(RATC<0.6) and (E1R<0)} or {(RATC>2.04 and (E1R>0)}.

Figure 12:
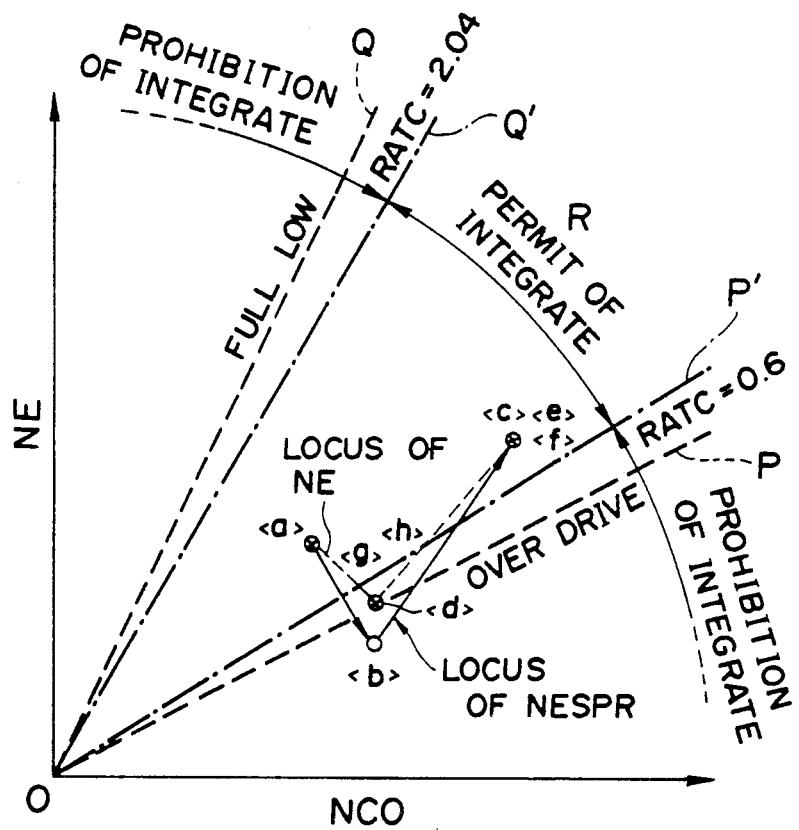
FIG. 12 is a diagram showing ratio lines for engine speed and clutch output speed using the FIG. 10 shift control.

The ratio lines which are the gear ratio limit values of the shift control, as shown in FIG. 12, are the OVERDRIVE line P and the FULL-LOW line Q as determined by the machine dimensions and other features of constitutive elements of the continuously variable transmission. An intermediate gear ratio range R is defined between the OVERDRIVE line P and the FULL-LOW line Q. When the actual ratio has moved to the vicinity of the OVERDRIVE line P and the FULL-LOW line Q in the intermediate ratio range R, the integral value X1IR becomes abnormal, and this disadvantage is overcome by forbidding the integral processing.

When the actual ratio RATC has moved to the vicinity of the OVERDRIVE line P and the FULL-LOW line Q in the intermediate ratio range R, the changeover unit (202) is changed over to the YES side to forbid the aforesaid integral processing, thus performing a shift control to change the gear ratio. Also when the actual ratio RATC in the vicinity of the OVERDRIVE line P and the FULL-LOW line Q is moved to the intermediate ratio range R, the changeover unit (202) is changed over to the NO side to permit the integral processing, and perform a shift control to change the gear ratio, thereby preventing the integral value X1IR from growing into an abnormal value and carrying out necessary integral processing as well as the proportional processing.

In the present embodiment, a trigger value of the actual ratio RATC used to judge the movement of the actual ratio RATC to the vicinity of the OVERDRIVE line P and the FULL-LOW line Q is set a little more on the intermediate ratio range R side than on the OVERDRIVE line P and the FULL-LOW line Q. That is, a trigger value line P' of the actual ratio RATC=0.6 is set a little more on the intermediate ratio range R side of the OVERDRIVE line P, and also a trigger value line Q' of the actual ratio RATC=2.04 a little more on the intermediate ratio range R side of the FULL-LOW line Q, for such reasons as the presence of mechanical difference between the theoretical and actual values of the OVERDRIVE line P and FULL-LOW line Q, the occurrence of detection error in a low speed range resulting from the inaccurate performance of sensors for detecting the vehicle speed, easy occurrence of errors at the time of computation of the vehicle speed signal and ratio value, and the performance of more integral processing than required because of a slower ratio change in the vicinity of the OVERDRIVE line P and the FULL-LOW line Q than in the intermediate ratio range R.

When the actual ratio RATC has moved to the vicinity of the OVERDRIVE line P and the FULL-LOW line Q over the trigger value lines P' and Q' thus set, that is, when the actual ratio RATC<0.6 or RATC>2.04, the integral processing is forbidden. Also if the shift control is made on the intermediate ratio range R when actual ratio RATC>0.6 or RATC<2.04, the integral processing is permitted.

Figure 10:
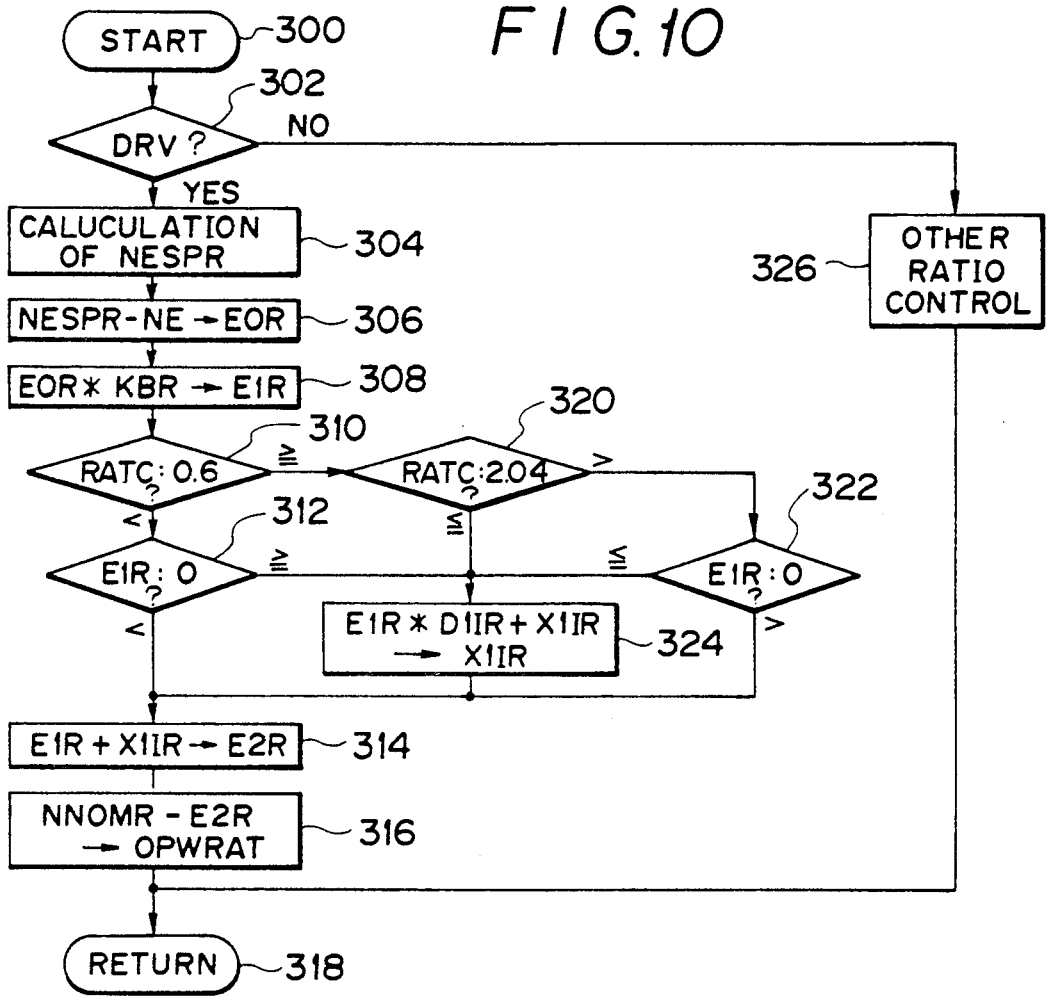
FIG. 10 is a flowchart explaining the function of another shift control of a continuously variable transmission according to the invention.

Next, the shift control of the continuously variable transmission 2 will hereinafter be described with reference to the flowchart in FIG. 10.

When an internal-combustion engine (not shown) operates, the shift control program of the continuously variable transmission 2 starts at 300, and first determines at 302 whether or not the state of operation is the DRIVE mode (DRV).

When the answer of this judgement (302) is YES, the target engine speed NESPR is computed (304), and the actual engine speed NE is subtracted from the target engine speed NESPR to find an error EOR (306), the error EOR being processed by proportional processing to obtain the first error E1R by the proportional gain KBR (308).

Next, a judgement is made to see whether the actual ratio RATC<0.6 or RATC≧0.6 (310). When RATC<0.6, a judgement is made to see whether the first error E1R<0 or E1R≧0 (312). When E1R<0, the second error E2R is calculated (314) from the integral value X1IR without adding {E1R * D1IR} to the previous integral value X1IR and the first error E1R, and the second error E2R is subtracted from the ratio solenoid null value NNOMR, thus obtaining the ratio solenoid duty OPWRAT (316) to return the program (318).

In the above-mentioned judgement (310), when the actual ratio RATC≧0.6, a judgement is made to see whether or not RATC>2.04 or RATC≦2.04 (320). When RATC>2.04, the first error E1R is judged to see whether E1R>0 or E1R≦0 (322). When E1R>0, the second error E2R is computed (314) from the integral value X1IR without adding {E1R * D1IR} to the previous integral value X1IR and the first error E1R, and the ratio solenoid duty OPWRAT is computed (316) by subtracting the second error E2R from the ratio solenoid value NNOMR, thus returning the program (318).

In the above-mentioned judgement (320), when the actual ratio RATC≦2.04, the integral value X1IR is calculated (324) by adding {E1R * D1IR} to the previous integral value X1IR; the second error E2R is computed (314) from this integral value X1IR and the first error E1R; and the ratio solenoid duty OPWRAT is computed (316) by subtracting the second error E2R from the ratio solenoid null value NNOMR, then returning the program (318).

Furthermore, when E1R≧0 if RATC<0.6 in the aforementioned judgement (310), or when E1R≦0 in the aforementioned judgement (322) if RATC>2.04 in the judgement (320), the integral value X1IR is computed (324) by adding {E1R * D1IR} to the previous integral value X1IR, and the second error E2R is computed (314) from this integral value X1IR and the first error E1R. Then the ratio solenoid duty OPWRAT is computed (316) by the subtraction of the second error E2R from the ratio solenoid null value NNOMR, then returning the program (318).

In the above-mentioned judgement (302), when the answer in NO, other ratio control is conducted (326), returning the program (318).

In one known system, when the actual ratio RATC has moved to the vicinity of the OVERDRIVE line P and the FULL-LOW line Q beyond the trigger value lines P' and Q', the integral processing is unconditionally forbidden and shift control is effected to change the gear ratio. At the same time, when the actual ratio RATC that has moved to the vicinity of the OVERDRIVE line P and the FULL-LOW line Q is moved toward the middle of the intermediate ratio range R, the integral processing is used to perform shift control in order to change the gear ratio, thereby preventing the storage of an abnormal integral value X1IR but also preventing execution of necessary integral and proportional processing.

Consequently it is possible with the present invention to remove an adverse effect upon the shift control resulting from an abnormal integral value, to obviate the deterioration of follow-up performance of the target engine speed, and to prevent the occurrence of shift delay caused by unconditionally forbidding integral processing in the vicinity of lines P and Q.

The shift control of the continuously variable transmission 2 will be described more particularly with reference to FIGS. 12 and 13.

FIG. 12 illustrates vehicle velocity NCO versus engine rotational speed NE, and changes of the target engine speed NESPR from <a> → <b> → <c> will be explained.

When the target engine speed NESPR has varied from <a> → <b>, and using a conventional approach wherein integral processing is not forbidden (C in FIG. 13), the actual engine speed NE reaches the OVERDRIVE line P, and the integral processing will be conducted although it is impossible to decrease the first error E1R in "<b> state". Therefore, as shown in FIG. 13, the integral value X1IR keeps on decreasing to an abnormal value.

Furthermore, using the conventional approach of prohibiting integral processing unconditionally whenever RATC<0.6 or RATC>2.04 (B in FIG. 13), the actual ratio RATC becomes RATC<0.6 at the <g> point in FIG. 12, thus forbidding integration. Therefore, the integral value X1IR will never become abnormal.

However, it is necessary to correct an abnormal value X1IR, if any, back to a normal value according to conventional approach C when the target engine speed NESPR has varied as <b> → <c>, resulting in a hard speed change.

Furthermore, in the case of conventional approach B, the control is performed using merely the proportional processing up to the <h> point; therefore it is hard to match the actual engine speed to the target engine speed NESPR. At this <h> point, the actual ratio RATC becomes RATC≧0.6, and the integral processing is therefore started at the <h> point to improve control quality, and at the <f> point the actual engine speed NE matches the target engine speed NESPR, resulting in a shift delay.

However, in the present invention, even though RATC<0.6, integration starts immediately when the first error becomes E1R≧0, and accordingly the actual engine speed comes to match the target engine speed NESPR at the <e> point, where no shift delay will take place.

According to the present invention, there is provided a control means which controls shifting to change the gear ratio by processing an error of an actual engine speed from a target engine speed through proportional and integral processings. When the actual gear ratio has been changed by this control means to the vicinity of the gear ratio limit value of an intermediate gear ratio range, the shift control forbids the integral processing except under specified conditions. Also, when the actual gear ratio is shifted to the range of the intermediate gear ratio, the integral processing is executed. This operation can prevent the accumulation of integral values to an abnormal value while also performing not only the proportional processing but the integral processing. In consequence it is possible to remove an adverse effect upon the shift control resulting from an abnormal integral value, to obviate the deterioration of follow-up performance of the target engine speed, and to prevent the occurrence of shift delay caused by unconditionally forbidding integral processing.

The embodiments of the invention in which an exclusive property or privilege is claimed are defined as follows:

1. In a shift control method for controlling shifting in a continuously variable transmission which changes a gear ratio by increasing or decreasing the turning radius of a belt installed on both a fixed pulley member and a movable pulley member with an increase or decrease in the width of a groove between the pulley members, the movable pulley member being movable into contact with, and away from, said fixed pulley member, said transmission having a shift control range associated therewith determined on the basis of the component structural elements thereof, said shift control range being bounded by a ratio line, the improvement comprising the steps of providing a control means for setting a target engine speed according to input throttle opening and vehicle speed information, and setting a limit value of said target engine speed in the vicinity of the ratio line but outside of said shift control range.

2. In a shift control method for controlling shifting in a continuously variable transmission which changes a gear ratio by increasing or decreasing the turning radius of a belt installed on two pulleys by increasing or decreasing the width of a groove between a fixed pulley member and a movable pulley member of each said pulley, said movable pulley member being movable into contact with, and away from, said fixed pulley member, the improvement comprising the steps of:
- providing a control means for controlling shifting to change the gear ratio by processing an error between an actual engine speed and a target engine speed by proportional and integral processings;
- determining that an actual gear ratio has been changed by said control means to the vicinity of a gear ratio limit value, and thereafter performing said integral processing unless a predetermined condition is satisfied; and
- performing said integral processing when the actual gear ratio is shifted from the vicinity of said gear ratio limit value to an intermediate gear ratio range.

3. The shift control method according to claim 2, wherein said predetermined condition is satisfied whenever said error between the actual engine speed and the target engine speed assumes any one of a set of predetermined values.

4. The shift control method according to claim 3, including the step of subtracting said actual engine speed from said target engine speed to obtain said error, said gear ratio limit value being one of a full low value and an overdrive value, said predetermined condition being satisfied by said error being positive when the actual gear ratio is in the vicinity of the full low value and being negative when the actual gear ratio is in the vicinity of the overdrive value, and said step of determining that the actual gear ratio is in the vicinity of the gear ratio limit value including determining when the actual gear ratio exceeds a first trigger value which is slightly less than the full low value and determining when the actual gear ratio is less than a second trigger value which is slightly greater than the overdrive value.

* * * * *